United States Patent
Obuchowska

(10) Patent No.: US 11,474,042 B2
(45) Date of Patent: Oct. 18, 2022

(54) APPARATUS FOR ANALYZING THE ELEMENTAL COMPOSITION OF A LIQUID SAMPLE AND METHODS OF USING THE SAME

(71) Applicant: Agnes Obuchowska, Ontario (CA)

(72) Inventor: Agnes Obuchowska, Ontario (CA)

( * ) Notice: Subject to any disclaimer, the term of this patent is extended or adjusted under 35 U.S.C. 154(b) by 839 days.

(21) Appl. No.: 16/326,595

(22) PCT Filed: Aug. 31, 2017

(86) PCT No.: PCT/CA2017/051032
§ 371 (c)(1),
(2) Date: Feb. 19, 2019

(87) PCT Pub. No.: WO2018/045455
PCT Pub. Date: Mar. 15, 2018

(65) Prior Publication Data
US 2021/0131971 A1 May 6, 2021

Related U.S. Application Data

(60) Provisional application No. 62/384,799, filed on Sep. 8, 2016.

(51) Int. Cl.
*G01N 21/67* (2006.01)
*G01N 21/69* (2006.01)
(Continued)

(52) U.S. Cl.
CPC .............. *G01N 21/67* (2013.01); *G01N 1/14* (2013.01); *G01N 21/69* (2013.01); *H01J 49/0431* (2013.01); *H01J 49/12* (2013.01)

(58) Field of Classification Search
CPC .......... G01N 21/67; G01N 21/69; G01N 1/14; G01N 2001/4038; H01J 49/12; H01J 49/431
See application file for complete search history.

(56) References Cited

U.S. PATENT DOCUMENTS 7,929,138 B1 4/2011 Webb et al.
2003/0103205 A1* 6/2003 Gianchandani ........ G01N 21/67
356/311
(Continued)

FOREIGN PATENT DOCUMENTS

WO WO-2015/075566 A1 5/2015

OTHER PUBLICATIONS

International Search Report and Written Opinion for PCT/CA2017/051032, dated Nov. 30. 2017, 7 pages.
(Continued)

*Primary Examiner* — Sang H Nguyen
(74) *Attorney, Agent, or Firm* — Blank Rome LLP

(57) ABSTRACT

A device and method is described for analysing the elemental composition of a liquid sample utilizing a combination of electrochemical pre-concentration followed by spectrochemical analysis of analytes in a single device. The device consists of two electrodes for the purpose of pre-concentration of the analyte ions by electrodeposition, a DC power supply/potentiostat/galvanostat, a high voltage power supply capable of creating an electrical discharge such as arc, spark, glow discharge or plasma, a spectrometer capable of recording a spectrum generated during such discharges as well as a pump(s) for pumping the analyte containing solution. Such a device is autonomous, field-deployable and capable of providing online analysis.

15 Claims, 15 Drawing Sheets

(51) Int. Cl.
　　　*H01J 49/04*　　　(2006.01)
　　　*H01J 49/12*　　　(2006.01)
　　　*G01N 1/14*　　　(2006.01)

(56) References Cited

U.S. PATENT DOCUMENTS

| | | | |
|---|---|---|---|
| 2004/0118348 | A1 | 6/2004 | Mills |
| 2004/0129579 | A1* | 7/2004 | Crooks .................. C12Q 1/001 204/400 |
| 2005/0195393 | A1* | 9/2005 | Karanassios ........... G01N 21/67 356/316 |
| 2013/0112953 | A1* | 5/2013 | Nobuki ............... H01L 51/5271 257/40 |
| 2014/0313508 | A1* | 10/2014 | Sokolov .................. G01J 3/443 356/313 |
| 2017/0097304 | A1* | 4/2017 | Schroeder ............. G01N 21/67 |
| 2018/0247804 | A1* | 8/2018 | Shelley ............. H01J 37/32981 |

OTHER PUBLICATIONS

H.R. Badiei, et al., "Taking Part of the Lab to the Sample: On-Site Electrodeposition of Pb followed by Measurement in a Lab Using Electrothermal, Near-Touch Vaporization Sample Introduction and Inductively Coupled Plasma-Atomic Emission Spectrometry", www.elsevier.com/locate/microc: Microchemical Journal, vol. 108, 2013., pp. 131-136.

"National Primary Drinking Water Regulations for Lead and Copper", Environmental Protection Agency, Federal Register, vol. 65, No. 8, Jan. 12, 2000, 66 pgs.

G. March, et al., "Modified Electrodes Used for Electrochemical Detection of Metal Ions in Environmental Analysis", www.mdpi.com/journal/biosensors/, Biosensors, 2015, vol. 5, pp. 241-275.

"Guidelines for Drinking-Water Quality", Third Edition Incorporating the First and Second Addenda; World Health Organization, Geneva 2008; 667 pgs.

N.M. Najali, et al., "Developing Electrodeposition Techniques for Preconcentration of Ultra-Traces of Ni, Cr and Pb Prior to Arc-Atomic Emission Spectrometry Determination", www.elsevier.com/locate/microc: Microchemical Journal, vol. 93, 2009, pp. 159-163.

A.K. Tareen, et al., "Detection of Heavy Metals (Pb, Sb, Al, As) Through Atomic Absorption Spectroscopy from Drinking Water of District Pishin, Balochistan, Pakistan", http://www.ijcmas.com; International Journal of Current Microbiology and Applied Sciences, vol. 3, No. 1, 2014, pp. 299-308.

"Guidelines for Canadian Drinking Water Quality Summary Table", Federal-Provincial-Territorial Committee on Drinking Water of the Federal-Provincial-Territorial Committee on Health and the Environment, Feb. 2017, 25 pgs.

\* cited by examiner

APPARATUS FOR ANALYZING THE ELEMENTAL COMPOSITION OF A LIQUID SAMPLE AND METHODS OF USING THE SAME

RELATED APPLICATIONS

This application is a national phase of PCT/CA2017/051032, filed on Aug. 31, 2017, which claims the benefit of U.S. Provisional Application No. 62/384,799, filed on Sep. 8, 2016. The entire contents of these applications are hereby incorporated by reference.

The present disclosure relates to a device for analyzing the elemental composition of a liquid sample and in particular to a device utilizing electrochemical pre-concentration of analytes on the surface of an electrode, vaporization and excitation of the deposited analytes by a high energy discharge or plasma and spectrochemical detection of the analytes based on their characteristic atomic emission or mass spectrometry signals.

BACKGROUND

Elemental analysis of samples is critical in many scientific disciplines and is routinely performed in environmental monitoring, drinking water monitoring and food analysis. Elemental analysis is often performed by optical atomic spectrometry techniques, such as atomic absorption (AA), inductively coupled plasma atomic emission spectrometry (ICP-OES), atomic fluorescence spectrometry (AFS), or by inductively coupled plasma mass spectrometry (ICP-MS). These methods can offer very good detection limits, although they require bulky and expensive equipment as well as the use of large amounts of gases such as argon in the case of ICP-OES and ICP-MS.

Portable methods based on atmospheric pressure cathodic glow discharge and detection of atomic emission signal have been previously described by Webb et al. (U.S. Pat. No. 7,929,138 B1). In this method, a glow discharge is created between an anode and an acidified analyte solution acting as a cathode. This method has lower power requirements, no need for gases, although it does require acidifying the analyte solution to pH 1. Since this method requires the use of strong acids and generates large amounts of acidified waste it is not practical in field applications.

Electrochemical approaches based on anodic or cathodic electrodeposition of metal ions offer very low detection limit (single ppb or lower) due to pre-concentration of the metal ions on the electrode surface, although they are also prone to interferences. To avoid these interferences, multi-elemental detection requires the use of several different electrode materials (March et al.).

Combination of electrochemical pre-concentration followed by spectrochemical detection of the deposited ions have been reported in the literature. Badiei et al. used a portable electrochemical device to pre-concentrate Cr(III), Cr(III)+Cr(VI) and Pb from sea water on portable Re filaments followed by detection using ICP-OES. The detection limits obtained were 2-20 pg/mL after 2-3 min electrodeposition and detection of Pb in hard tap water was demonstrated. Mashkouri Najafi et al. preconcentrated Ni, Cr and Pb on a graphite electrode in an electrochemical cell followed by transferring the graphite electrode to an arc atomic emission spectrometer (ED-AAES) for analysis. The detection limits obtained were ~3 ppb after a 30 min preconcentration. Komarek et al. detected traces of Cu, Cd, Pb, Ni, and Cr by electrochemical preconcentration on a graphite probe followed by electrothermal atomic absorption spectrometry. Batley and Matousek used a tubular graphite coated furnace in a flow through cell to preconcentrate heavy metals by co-deposition with mercury. The furnace was then transferred to an atomic absorption spectrometer for analysis. The method allowed detection of 0.02 ppb of Co and Ni after 15 min and 10 min preconcentration, respectively. This method required a careful washing of the electrode prior to atomic absorption analysis to eliminate interference from Na ions in AA.

Ability to analyze metal ions online, for example in drinking water purification plants, is extremely valuable as it allows real-time, round the clock monitoring of water quality without the need to send water samples to the lab. Online metal ion monitoring systems based on electrochemical detection are commercially available offering low ppb detection limits. The equipment however, is bulky and expensive, and multi-element monitoring requires the use of more than one electrode material as well as different buffers, which significantly adds to the complexity of the system. In addition, the reagents and buffers used are contamination prone.

Thus, there is a great need for a simple, reagent-free and field-deployable method that provides a highly sensitive multi-elemental detection with minimal elemental interferences and matrix effects which also allows analysis of metal ions online.

SUMMARY

According to one aspect there is provided a device for analyzing the elemental composition of a liquid sample, comprising: an inlet tube; a pumping system for pumping liquid in and out of the device; a capillary tube connected to inlet and outlet tubes; two electrodes inside the capillary tube connected to either a DC power supply/potentiostat/galvanostat or a constant or pulsed high voltage DC or high voltage AC power supply; an optical or mass spectrometer capable of recording an emission spectrum from a high voltage discharge between the two electrodes; a mirrored surface placed behind the capillary or covering part of the capillary and positioned across from the optical spectrometer's entrance slit or fiber optic cable connected to the optical spectrometer.

According to another aspect there is provided a method of analyzing the elemental composition of a liquid sample, the method comprising the steps of: providing the device described above; pumping the analyte solution through the device at a set flow rate during which time a potential sufficient for electrodeposition of the analytes is applied between the two electrodes; the liquid is pumped out of the capillary tube and the application of a DC potential is stopped either before or after the solution is pumped out of the capillary; high voltage is then applied between the electrodes resulting in generation of a discharge such as arc, spark, glow discharge or plasma; recording the resulting emission or mass spectrum generated during the high voltage discharge; pumping the same solution as was used during the electrodeposition step or a new solution through the capillary and application of a DC potential of opposite polarity to that used during electrodeposition to remove any remaining electrodeposited material and thus cleaning the electrode surface; and pumping the solution out of the device.

According to yet another aspect there is provided a device for analyzing the elemental composition of a liquid sample comprising: an inlet tube protruding through the bottom of a cup or a container; an outlet tube placed inside the bottom of the cup or container; a pumping system for pumping liquid in and out of the device; two electrodes placed directly above the inlet tube; a voltage source such as a DC power supply or a potentiostat/galvanostat and a DC or AC high voltage power supply; an optical or mass spectrometer capable of recording an emission or a mass spectrum from a high voltage discharge between the two electrodes; a mirrored surface placed behind the two electrodes and positioned across from the optical spectrometer's entrance slit or fiber optic cable connected to the optical spectrometer.

According to yet another aspect of the device there is provided a method for analyzing the elemental composition of a liquid sample comprising: providing the device described above; pumping the liquid into the cup or container during which time the two electrodes are submerged inside the stream of the flowing solution; and applying a potential between the two electrodes resulting in electrodeposition of the analytes on the electrode surface; subsequent discontinuation of pumping which results in the electrodes no longer being submerged in the stream of the flowing liquid and being exposed to air; application of high voltage between the two electrodes which causes a discharge such as an arc, spark, glow discharge or plasma; recording the resulting emission or mass spectrum generated during the high voltage discharge; pumping the same solution as was used during the electrodeposition step or a new solution through the device and application of a DC potential of opposite polarity to that used during electrodeposition to remove any remaining electrodeposited material and thus cleaning the electrode surface; and pumping the solution out of the device.

BRIEF DESCRIPTION OF THE DRAWINGS

Embodiments will now be described by way of example only with reference to the accompanying drawings in which.

DETAILED DESCRIPTION OF EMBODIMENTS

Figure 1A:
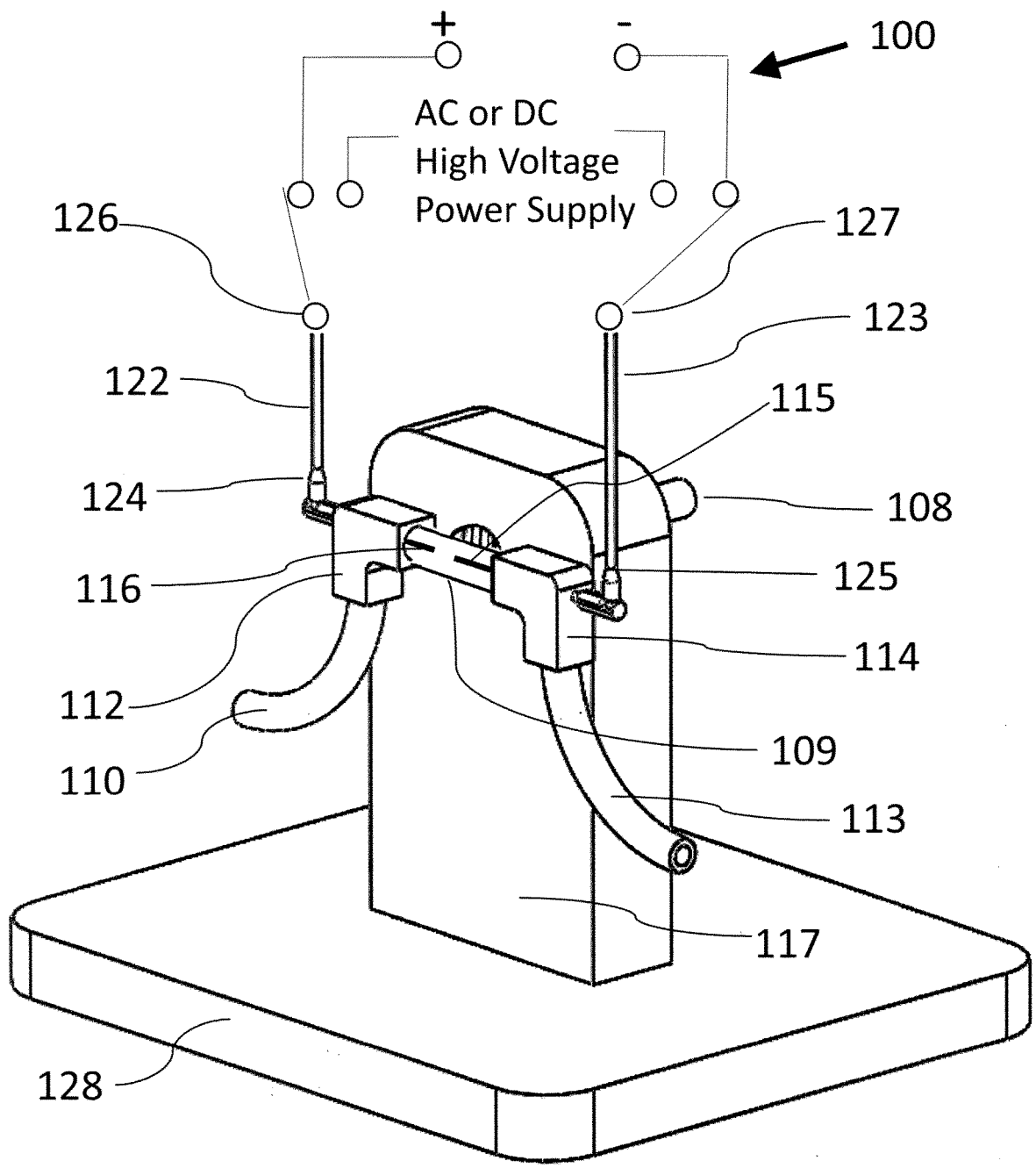
FIG. 1a is a side view of a device utilizing a transparent capillary tube and optical detection
Figure 1B:
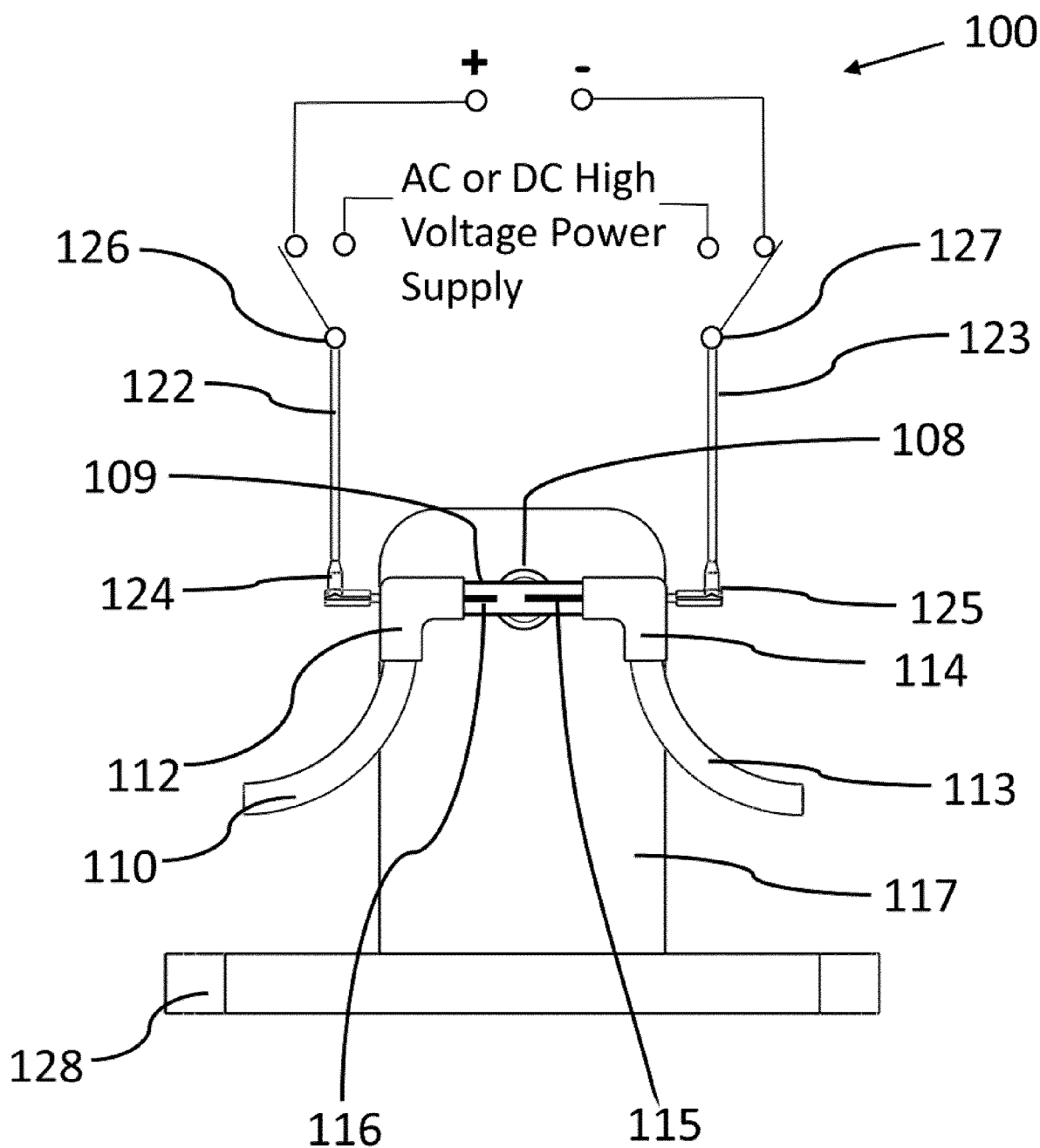
FIG. 1b is a front view of a device utilizing a transparent capillary tube and optical detection
Figure 1C:
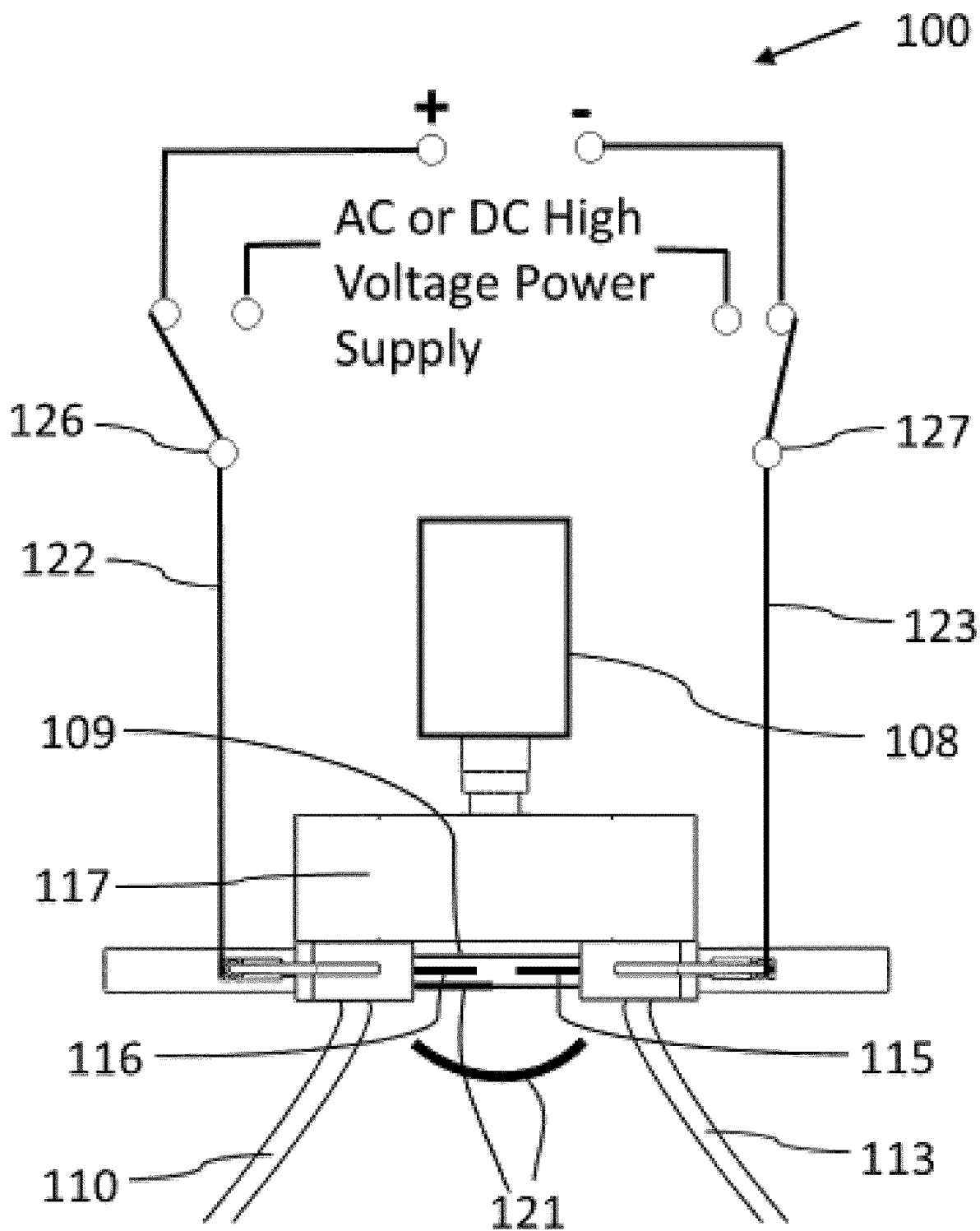
FIG. 1c is a top view of a device utilizing a transparent capillary tube and optical detection

Portable devices can be used for detection of various metal, metalloid and non-metal ions in liquid samples. Detecting low concentration of analytes can be facilitated through a variety of methods including, but not limited to, electrodeposition followed by electrochemical detection. Electrochemical detection however, is prone to interference by, for example, formation of metal ion complexes or by other substances as well as from overlap of broad peaks in anodic/cathodic stripping voltammetry. In addition, electrochemical detection is dependent on solution characteristics, such as solution pH. Therefore, it can be desirable to combine the electrodeposition technique for pre-concentrating the analytes with spectrometric detection of sufficient resolution making the method specific to various analytes of interest. It is also desirable for the method to be autonomous, field-deployable as well as capable of providing online analysis and continuous, operator-free data on the concentration levels of metal ions in a liquid sample.

For convenience, like numerals in the description refer to like structures in the drawings. Referring to FIG. 1a-1j, an embodiment of a device for analyzing the elemental composition of a liquid sample is shown and generally identified by reference character 100. The device 100 comprises a spectrometer 108 (FIGS. 1c, 1h and 1i) capable of recording an emission spectrum of the electric discharge, a capillary tube 109 composed of a transparent material including, but not limited to, glass or quartz; an inlet tube 110 which may be connected to a pump 111 on one end (FIGS. 1d and 1f) and to the transparent capillary tube 109 on the other end through a connector 112, an outlet tube 113 connected to the capillary tube 109 through a connector 114 and may be connected to a pump 111 (FIGS. 1e and 1g), two electrodes—a working electrode 115 and a counter electrode 116, a support 117 onto which the capillary 109 is mounted, a hole 118 in the support 117 over which the capillary 109 is placed, a fiber optic cable of the spectrometer 108 placed inside the hole 118 on the other side of the support 117 or the spectrometer's 108 entrance slit placed in front of the hole 118, a mirrored surface 121 (FIGS. 1c, 1h and 1i) placed behind the capillary or covering part of the capillary and positioned across an entrance slit of the spectrometer 108 or a fiber optic cable connected to the spectrometer 108, electrical cables 122 and 123 connected to electrodes 115 and 116 through electrical connectors 124 and 125, three way toggle switches 126 and 127 connecting the electrical cables 122 and 123 to either a DC power supply/potentiostat/galvanostat or a high voltage power supply such as an AC or constant or pulsed DC high voltage power supply, a base 128 inside which the support 117 is placed.

The solution is pumped through the device 100 for a period of time required for deposition of a sufficient amount of analytes on the surface of the anode or cathode electrodes. In the case of cathodic deposition the analyte ions are deposited on the surface of the cathode electrode. Anodic deposition is also possible. The duration of electrodeposition will depend on the applied voltage, the flow rate of the solution, the sensitivity of the method as well as the concentration of analyte in the solution. Higher solution flow rates, higher electrodeposition potential, and higher analyte concentration in solution would require lower electrodeposition time. During this time constant voltage or constant current is supplied to the electrodes through a potentiostat/galvanostat or a DC power supply. The high voltage power supply is disconnected during this time.

Figure 1D:
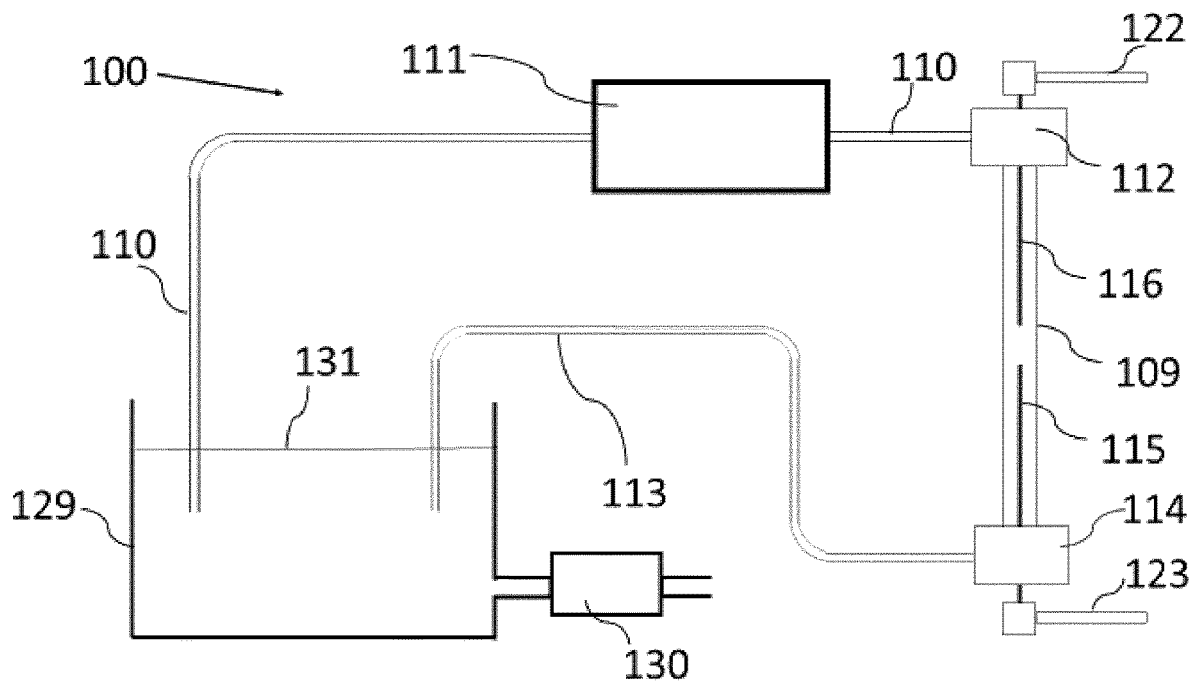
FIG. 1d is a sketch of a device utilizing a transparent capillary tube, optical detection and a pump and depicting a valve and/or another pumping system used for pumping the liquid in and/or out of a container in which the inlet and/or the outlet tubes are submerged. The device's pumping system is connected to capillary's inlet tube.
Figure 1E:
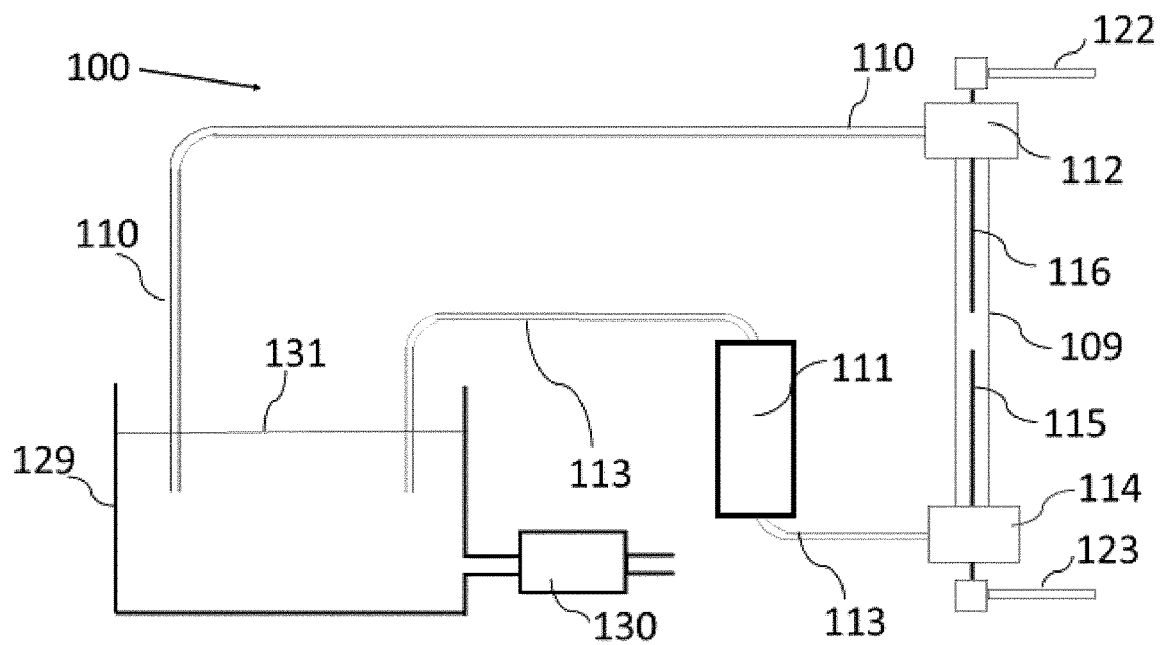
FIG. 1e is a sketch of a device utilizing a transparent capillary tube, optical detection and a pump and depicting a valve and/or another pumping system used for pumping the liquid in and/or out of a container in which the inlet and/or the outlet tubes are submerged. The device's pumping system is connected to capillary's outlet tube.
Figure 1F:
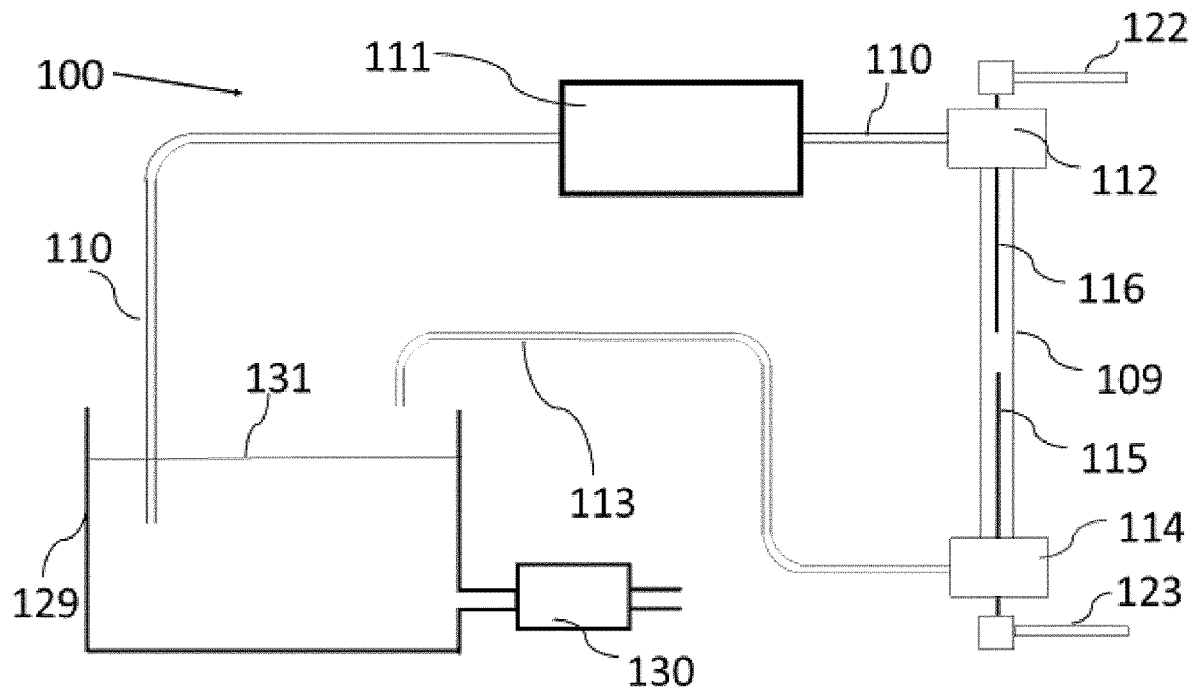
FIG. 1f is a sketch of a device utilizing a transparent capillary tube, optical detection and depicting a reversible pumping system connected to the inlet of the capillary tube. Only the inlet tube is submerged in the liquid while the outlet tube is positioned above the surface of the liquid.
Figure 1G:
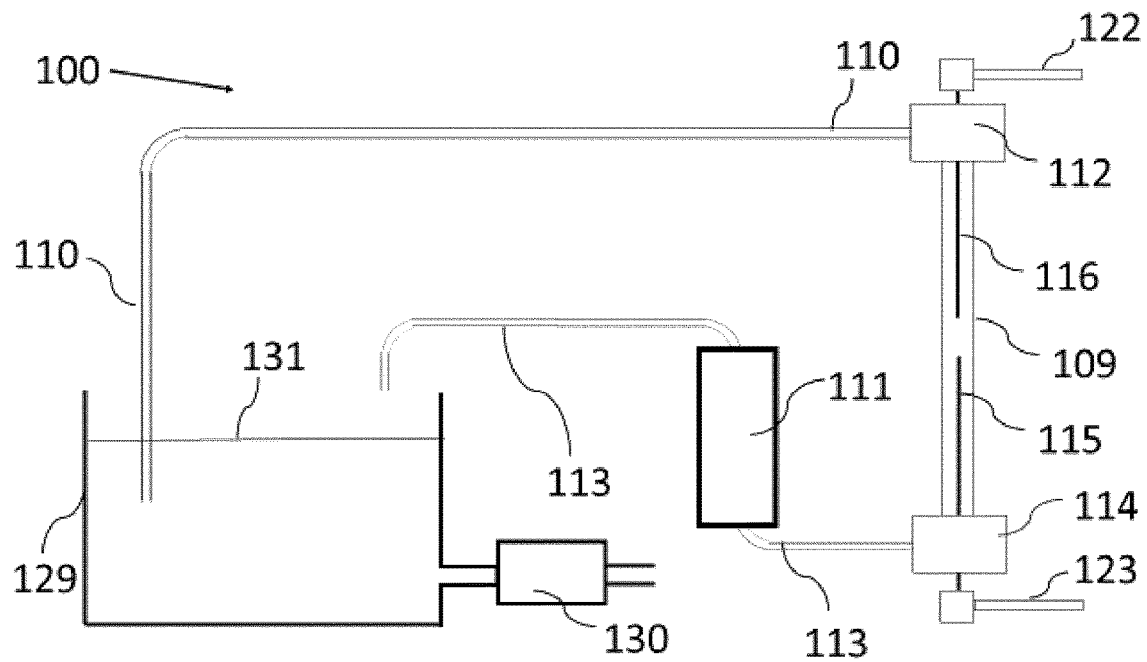
FIG. 1g is a sketch of a device utilizing a transparent capillary tube, optical detection and depicting a reversible pumping system connected to the outlet of the capillary tube. Only the inlet tube is submerged in the liquid while the outlet tube is positioned above the surface of the liquid.

After the electrodeposition step is complete, the solution is pumped out of the capillary 109. This may be accomplished by pumping out the liquid from reservoir 129 (FIGS. 1d- and 1e) so that the inlet tube 110 and/or the outlet tube 113 are no longer submerged in the liquid. This results in the device's pumping system 111 pumping air into the capillary instead of the liquid. As shown in FIGS. 1d and 1e, draining of the liquid may be accomplished by opening a valve 130, by activating another pump 130 or by other means. Alternatively, the solution may be pumped out of the capillary by reversing the pump flow direction for a period of time sufficient to pump all the solution out of the capillary 109. As shown in FIGS. 1f and 1g a reversible pump 111 may be used. In this setup, the inlet tube 110 may be positioned inside the liquid being analyzed while the outlet tube 113 may be positioned above liquid surface 131 in order to drain out the capillary 109 when the flow direction of the reversible pump 111 is reversed. The reversible pump may be connected to either the inlet or the outlet of the capillary tube. After the solution is pumped out of the capillary, three way toggle switches 126 and 127 (FIG. 1a) then redirect the circuit to an AC or to a constant or pulsed DC high voltage power supply. The high voltage power supply applies a high voltage between the electrodes 115 and 116 and creates a discharge such as arc, spark, glow discharge or plasma. Application of a pulsed DC discharge between the two electrodes 115 and 116 could reduce overheating of the electrodes by allowing the electrodes to cool periodically and thus reduce the erosion of the electrodes. It can also be used to modulate the signal of interest through a triggered data acquisition to improve the signal to noise ratio.

Figure 1H:
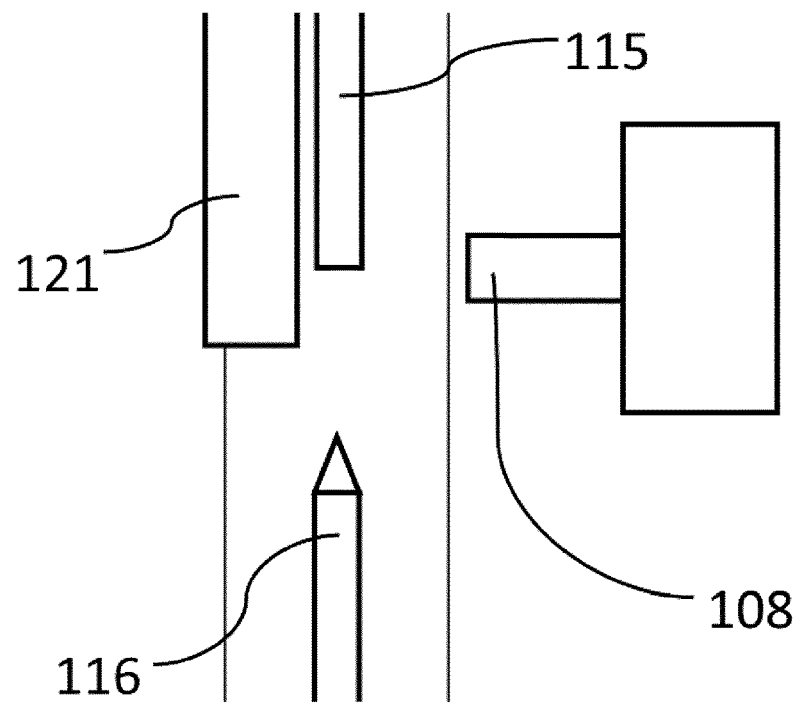
FIG. 1h is a side view of a transparent capillary tube with the fiber optic cable or entrance slit of the spectrometer as well as the mirror placed in front of only the working electrode.
Figure 1I:
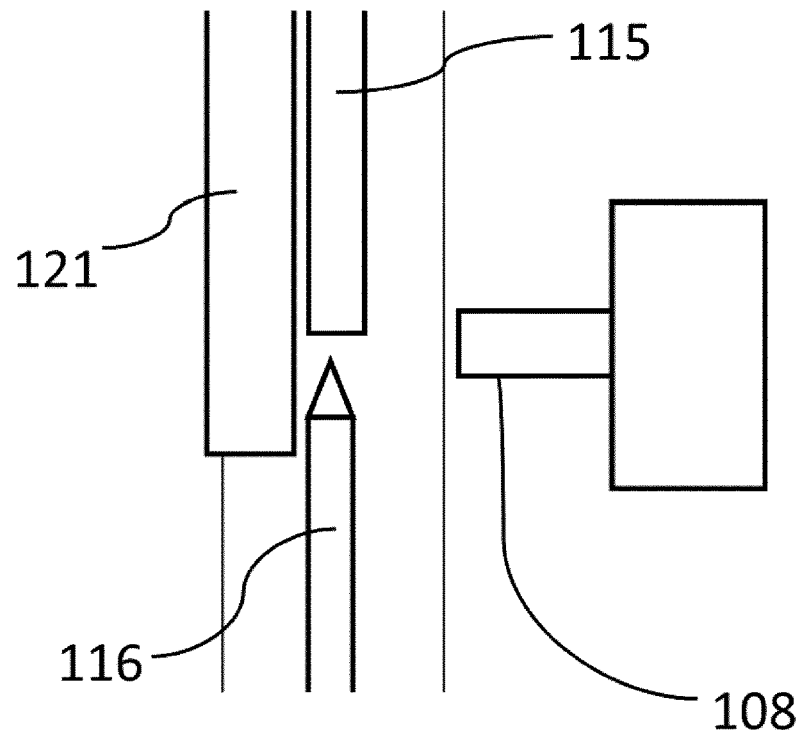
FIG. 1i is a side view of a transparent capillary tube with the fiber optic cable or entrance slit of the spectrometer as well as the mirror placed in front of both the working and counter electrodes.

The electric discharge vaporizes, atomizes, and excites the analytes deposited on the electrode surface 115 and/or 116 and the resulting atomic emission spectrum is recorded by a spectrometer. The entrance slit of an optical spectrometer can be placed directly behind a hole 118 in the support 117 over which the transparent capillary is mounted. Alternatively, a fiber optic cable connected to an optical spectrometer can be placed inside the hole 118 and used for collecting the light emitted during the electric discharge. A flat mirror, a concave mirror or a mirrored surface 121 wrapped around a portion of the capillary 110 (FIG. 1c) can be placed across from the hole 118 and used for reflecting the light emitted from the discharge into the fiber optic cable or directly into the spectrometer's 109 entrance slit, thus improving the light throughput into the spectrometer and hence improving the sensitivity of the device. As shown in FIG. 1h, the fiber optic cable or the spectrometer's entrance slit 109 may be placed directly in front of the electroactive end of electrode being monitored (the working electrode) 115 and not in front of the electrode not being monitored (the counter electrode) 116. Also, the edge of the mirror 121 may or may not extend just below the surface of the electrode being monitored (the working electrode) 115 and may be positioned above the surface of the electrode not being monitored (the counter electrode) 116. Alternatively, as shown in FIG. 1i, the fiber optic cable or the spectrometer entrance slit 109 as well as the mirror 121 may be placed in front of the electroactive ends of both electrodes as would be required during simultaneous monitoring of both anodic and cathodic deposition. As shown in FIG. 1h, the electroactive surface of the electrode 115 that is being monitored (the working electrode) may be flat in order to increase the efficiency of light collection at the fiber optic cable or the spectrometer entrance slit. In addition, the electroactive surface of the counter electrode may be sharpened in order to guide the electric discharge to the entire electroactive surface of the working electrode.

The inlet tube 110, the outlet tube 113 as well as the connectors 112 and 114 should be made of materials which do not leach metal or other ions which are being detected.

Figure 2:
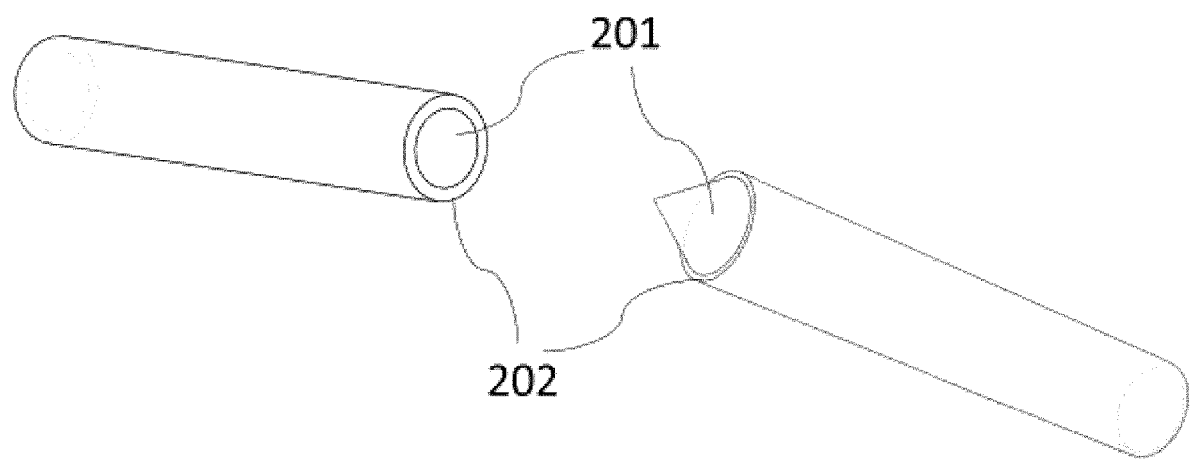
FIG. 2 is a side view of a working electrode with a flat end and side view of a counter electrode with a sharpened end with layers of non-conductive and inert coatings surrounding the electrodes.

The working electrode 115 and the counter electrode 116 may be composed of various materials including, but not limited to, graphite, graphite composite, carbon nanotubes, graphene, fullerene, tungsten, molybdenum, platinum, iridium, gold, aluminum, rhenium, ruthenium, titanium, tantalum or their oxides as well as composite electrodes or electrodes composed of films deposited on the surface of a solid electrode. The portions of the counter electrode 116 or the working electrode 115 which come in contact with solution may or may not be covered by a non-conductive and inert coating including, but not limited to, a Teflon coating or its derivatives, leaving only the electroactive end of the electrode exposed. The purpose of the coating is to eliminate electrodeposition on surfaces of the electrode other than the end of the electrode. FIG. 2 depicts electrodes 201 covered by an inert coating 202 leaving only the end of the electrodes exposed. In case of a flat-ended electrode, only the flat surface is left exposed while in case of a sharpened electrode, the sharpened tip may be left uncovered by the coating.

Figure 1J:
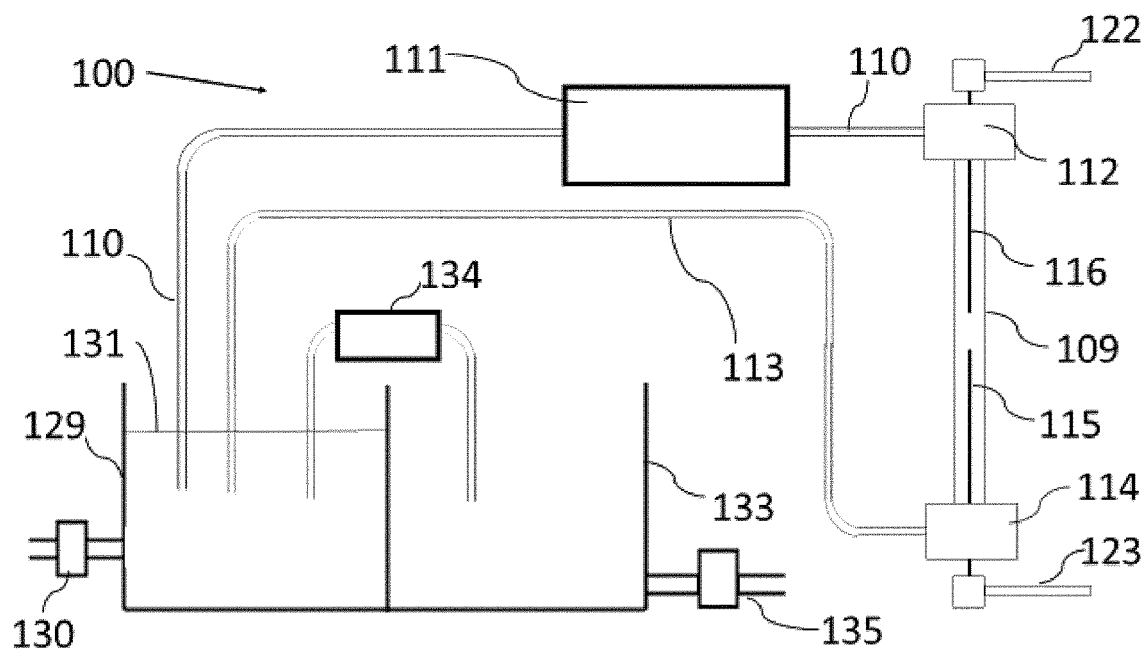
FIG. 1j is a sketch of a device utilizing a transparent capillary tube, optical detection, reversible pumping system connected to the inlet of the capillary tube, a second reservoir and another reversible pumping system for pumping liquid from the first reservoir to the second reservoir and vice versa.

After the data acquisition step is complete, a new solution or the same solution which was used during the electrodeposition step is pumped through the capillary and a voltage of opposite polarity is applied between the two electrodes to remove any remaining electrodeposited material and thus cleaning the electrode surfaces. As shown in FIGS. 1f-1g, the same solution can be used by pumping liquid through the capillary in the same manner as was done during the electrodeposition step. Alternatively, as shown in FIG. 1j this can be done by utilizing a second reservoir 133 and a reversible pumping system 134 for pumping liquid from the first reservoir 129 to the second reservoir 133 and vice versa. Thus, before the electric discharge step and signal acquisition step, the liquid is pumped from the first reservoir 129 to the second reservoir 133. After data acquisition step is complete, the solution from the second reservoir 133 is pumped back to the first reservoir 129 and pumped through the capillary 109 during the cleaning step. Alternatively, a new solution may be used during the cleaning step by pumping a fresh solution through the capillary 109 in a setup shown in FIGS. 1d and 1e. After the cleaning step is complete the solution is pumped out from the reservoir(s) and prepared for the next analysis cycle by either opening a valve or starting a pumping system 130 or 135 in FIGS. 1d-1g and 1j. A single valve or a pumping system may be used to pump liquid into and out of the reservoir 129 in FIGS. 1d to 1g or, alternatively, separate valves or pumping systems may be used for pumping liquid into and out of the reservoir 129.

The vertical support 117 along with the attached capillary tube 109, the electrodes 115 and 116, the connectors 112 and 114 as well as the inlet and outlet tubes 110 and 113, can be replaced periodically if the electrodes are eroded or the surface of the capillary is fouled by the solution or the discharge components. The assembly on support 117 can therefore be considered a consumable.

Figure 3:
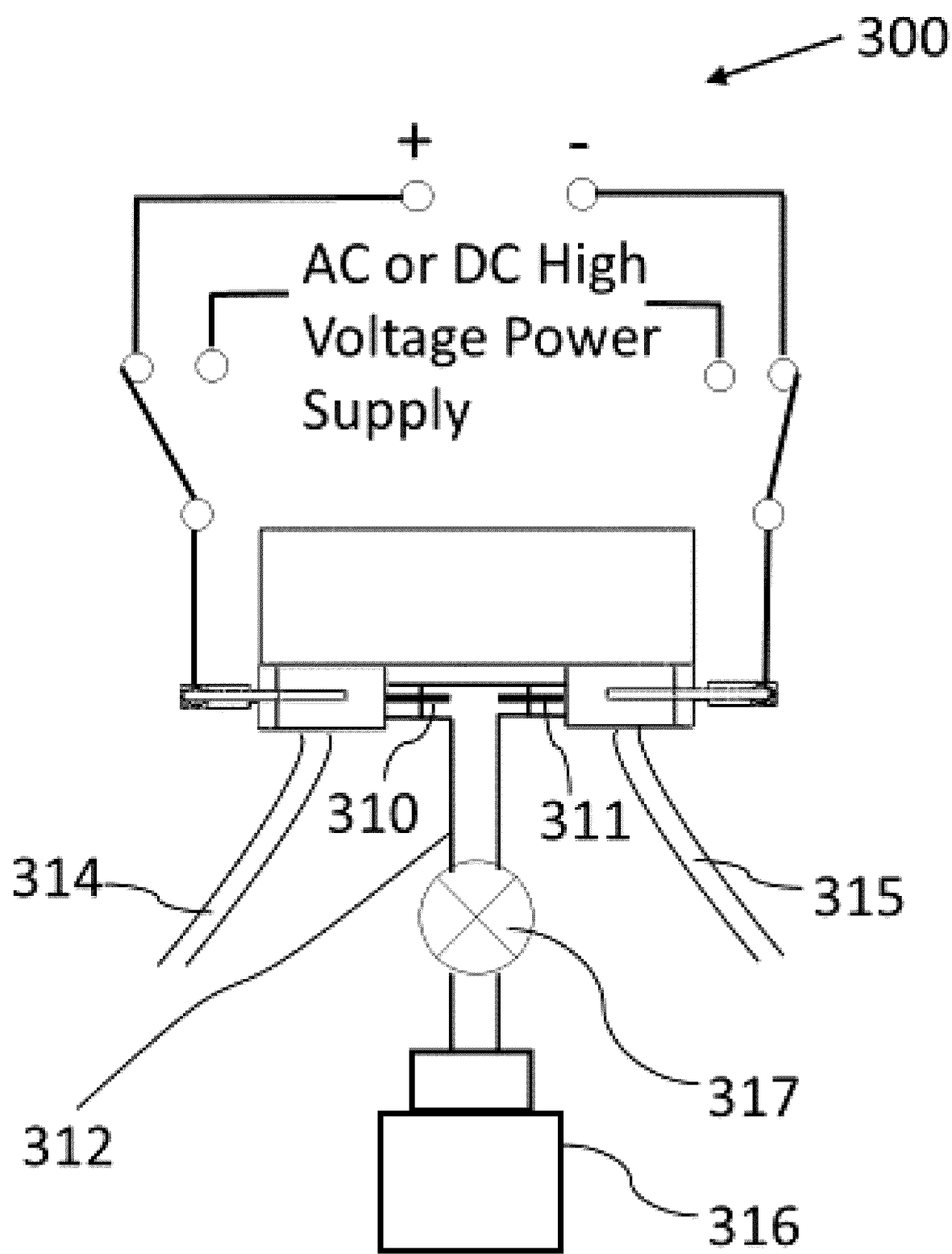
FIG. 3 is a top view of a device utilizing a capillary tube and mass spectrometric detection

Although the above description of the embodiment 100 refers to detection by an optical spectrometer, it will be appreciated by those skilled in the art that mass spectrometric (MS) detection is also possible. FIG. 3 shows an embodiment of a device similar to device 100 but utilizing MS detection and is identified by reference character 300. As in device 100, two electrodes 310 and 311 are placed inside a capillary 312. In this device, a T-shaped capillary 312 or a T-connector 312 placed anywhere along a capillary tube, is connected to the mass spectrometer inlet 316. A valve 317 is placed between the T-shaped capillary or the T-connector 312 and the mass spectrometer 316 and allows the analyte solution to flow out of the outlet tube 315 in the closed position and sampling the ions generated during the electric discharge for MS analysis in the open position. Since mass spectrometric detection is used in this embodiment, the capillary or the T connector 312 do not need to be composed of a clear material.

Turning to FIG. 4, an alternative embodiment of a device for analyzing the elemental composition of a liquid sample is shown and generally identified by reference character 400. The device 400 is similar to the device 100 as previously described. In this embodiment, however, the anode 410 and cathode 411 electrodes are placed above and perpendicular to inlet tubing 412 through which solution is pumped. The inlet tubing 412 and the outlet tubing 413 are placed inside a cup or a container 414. The advantage of this configuration over that shown in FIG. 1 is primarily to avoid any possible fouling of the capillary 109.

Figure 4A:
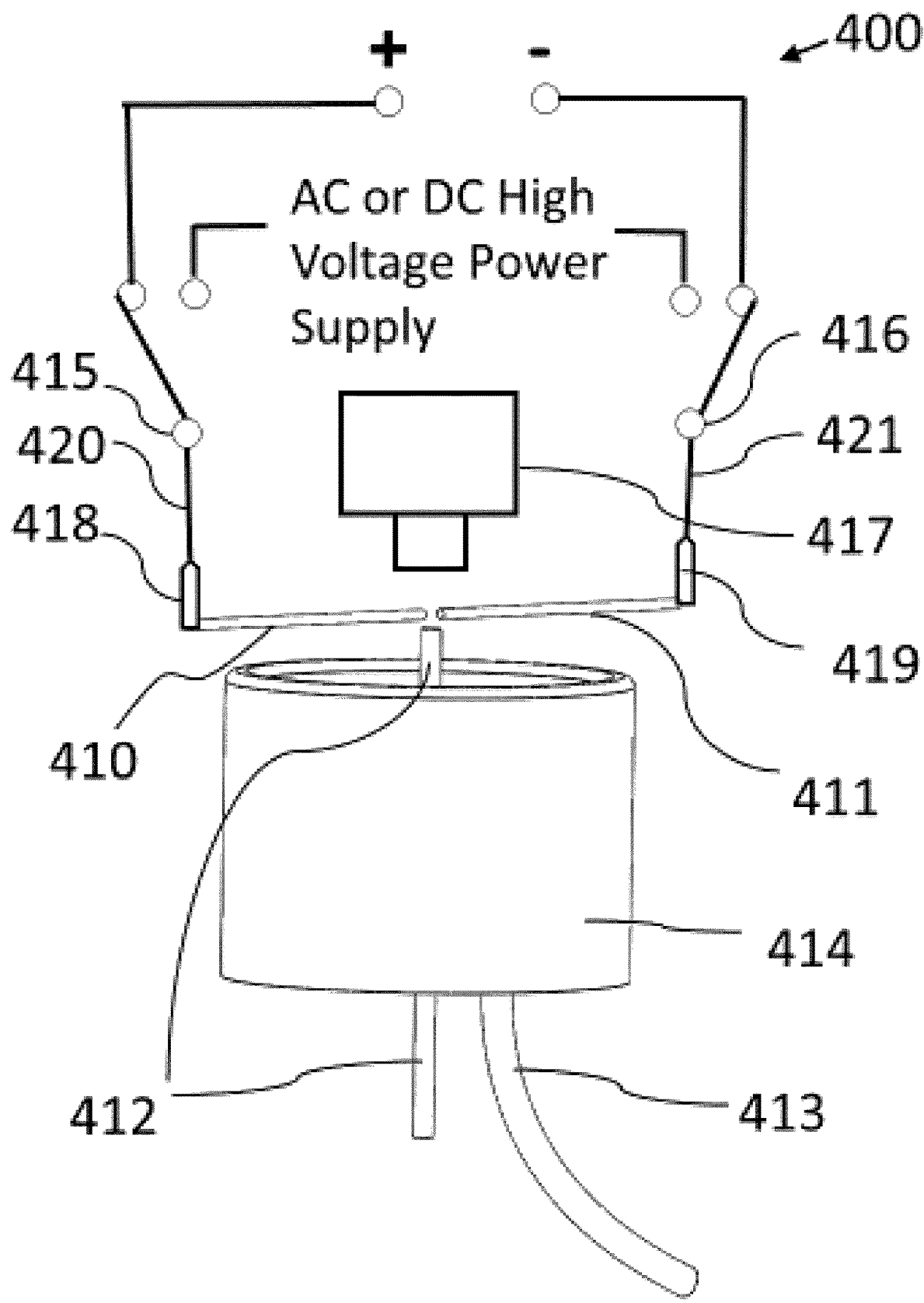
FIG. 4a is a front view of a device utilizing a cap/container and shown with the flow turned off and no liquid flowing through the device
Figure 4B:
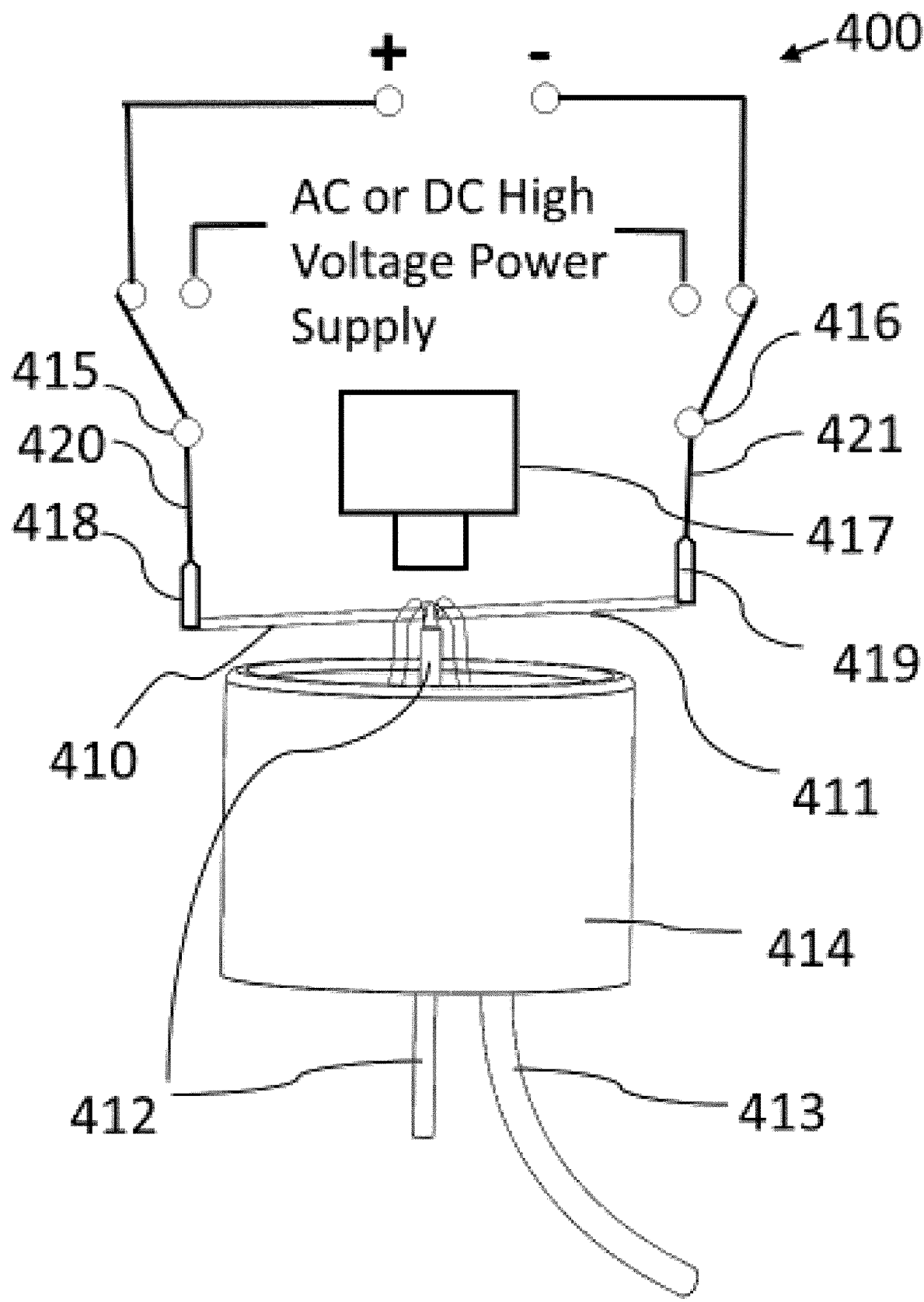
FIG. 4b is a front view of a device utilizing a cup/container and shown with the solution flowing through the device

As shown in FIG. 4a-b, the anode 410 and cathode 411 are placed above and perpendicular to the inlet tube 412. The inlet tube could be made of glass, quartz, plastic, ceramic or any non-conductive material which does not leach metal or other ions. As liquid flows through the inlet tube the tips of electrodes 410 and 411 are submerged in the overflowing liquid, as shown in FIG. 4b. During this time the analyte is electrodeposited on the tip surface of the cathode 411 in the case of cathodic electrodeposition or the tip of the anode 410 in the case of anodic electrodeposition. Also, the solution is pumped out of the cup/container 414 through the outlet tube 413. After a period of time sufficient for deposition of an adequate amount of analyte on the electrode surface, the flow of liquid is discontinued. This may be accomplished by stopping the pump and allowing the liquid to drain out of the cup by gravity or by reversing the flow of a reversible pump in a pumping system similar to the one described in FIG. 1d. Alternatively, this may be accomplished by removing the liquid in which the inlet tube is submerged by opening a valve or by turning on another pump. The electrodes 410 and 411 are then no longer submerged in the liquid. Three way toggle switches 415 and 416 then redirect the circuit from the DC power supply or potentiostat/galvanostat to a high voltage AC or to a constant or pulsed high voltage DC power supply. The optical emission signal emitted from the electric discharge or the mass spectrum of the discharge components is detected by an optical or mass spectrometer, respectively. A fiber optic cable, an entrance slit of the optical spectrometer or mass spectrometer sampler orifice or inlet tube 417 is positioned at a distance from the discharge which is sufficient for recording of the emission signal from the electric discharge or sample the ions generated by the discharge. As for device 100, any remaining electrodeposited material may be removed from the electrodes by pumping liquid through the device and applying potential of opposite polarity to that which was applied during the electrodeposition step. The cycle of electrodeposition followed by electric discharge and spectrometric detection and then a cleaning step can be repeated at a desired frequency and in an autonomous fashion for online detection applications.

Figure 4C:
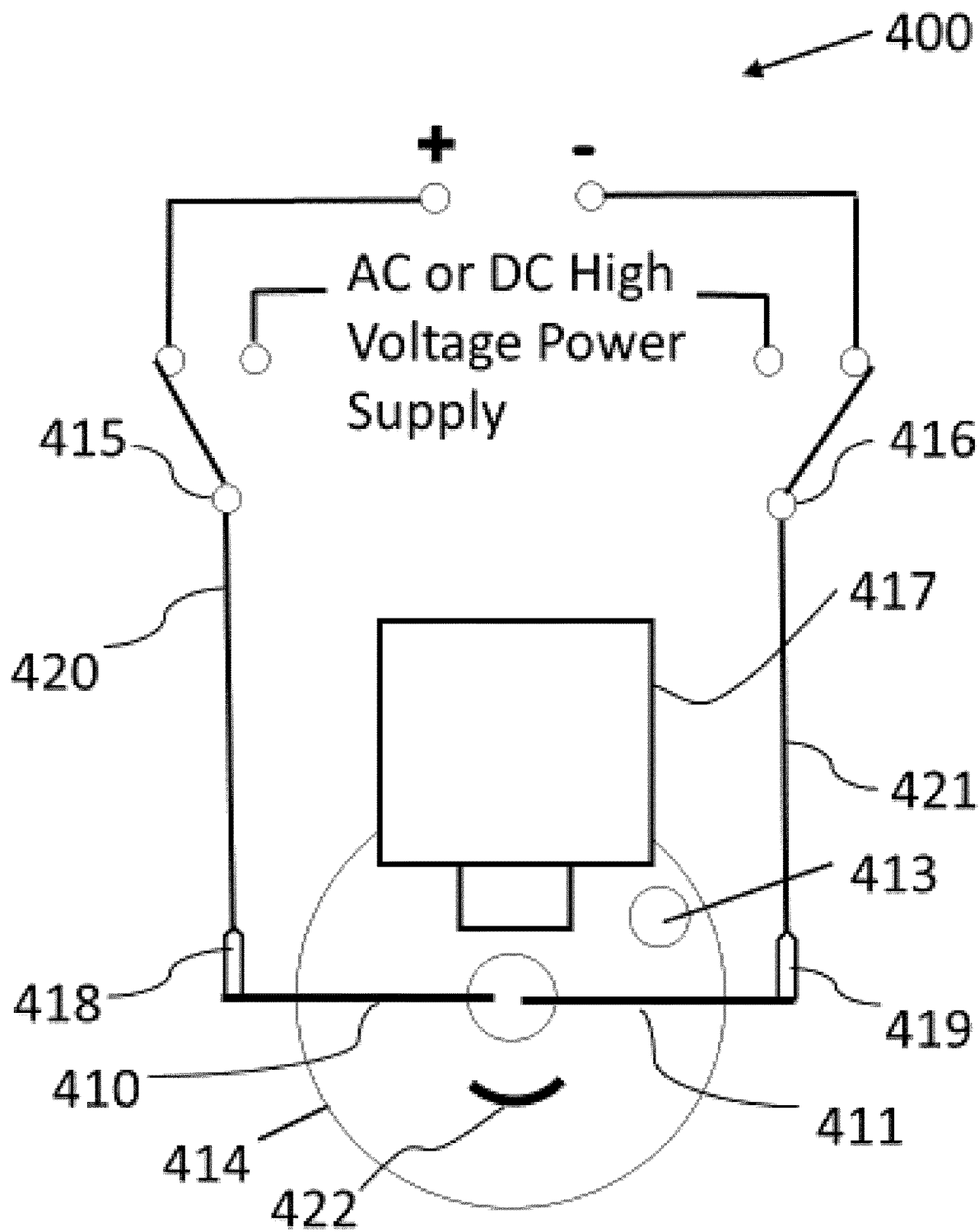
FIG. 4c is a top view of a device utilizing a cap/container FIG. 5a are two consecutive spectra obtained during an application of an electric discharge with an apparatus 100; 10 min electrodeposition at 12V; 10 ppb of Cd, Hg, Pb and Cr spiked into a 130 ppm (total hardness) tap water sample (spectral region shown: 204 nm-500 nm).
Figure 5A:
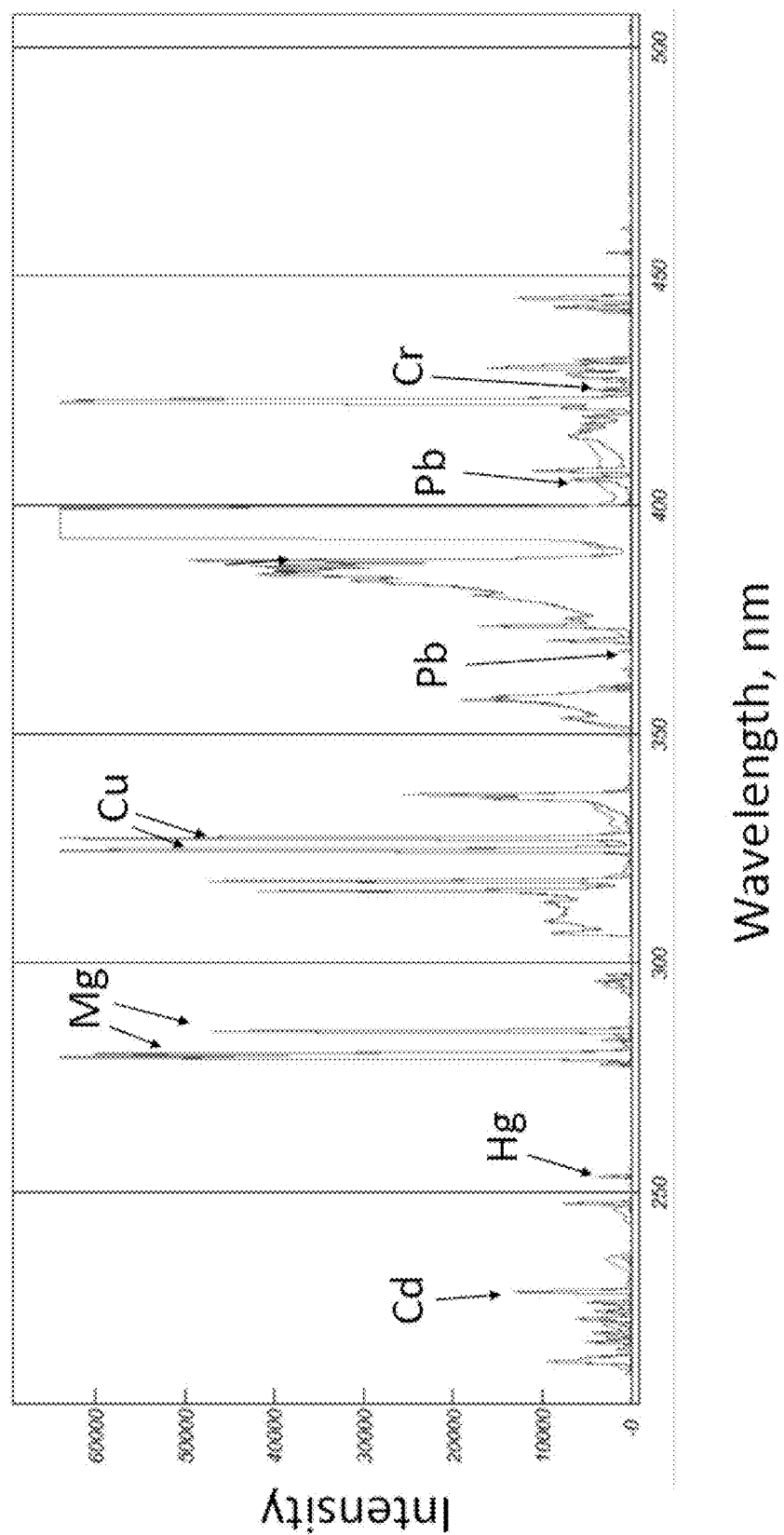
FIG. 5b are two consecutive spectra obtained during an application of an electric discharge with an apparatus 100; 10 min electrodeposition at 12V; 10 ppb of Cd, Hg, Pb and Cr spiked into a 130 ppm (total hardness) tap water sample (spectral region shown: 204 nm-265 nm).
FIG. 5c are two consecutive spectra obtained during an application of an electric discharge with an apparatus 100; 10 min electrodeposition at 12V; 10 ppb of Cd, Hg, Pb and Cr spiked into a 130 ppm (total hardness) tap water sample (spectral region shown: 275 nm-343 nm).
FIG. 5d are two consecutive spectra obtained during an application of an electric discharge with an apparatus 100; 10 min electrodeposition at 12V; 10 ppb of Cd, Hg, Pb and Cr spiked into a 130 ppm (total hardness) tap water sample (spectral region shown: 360 nm-433 nm)
Figure 5B:
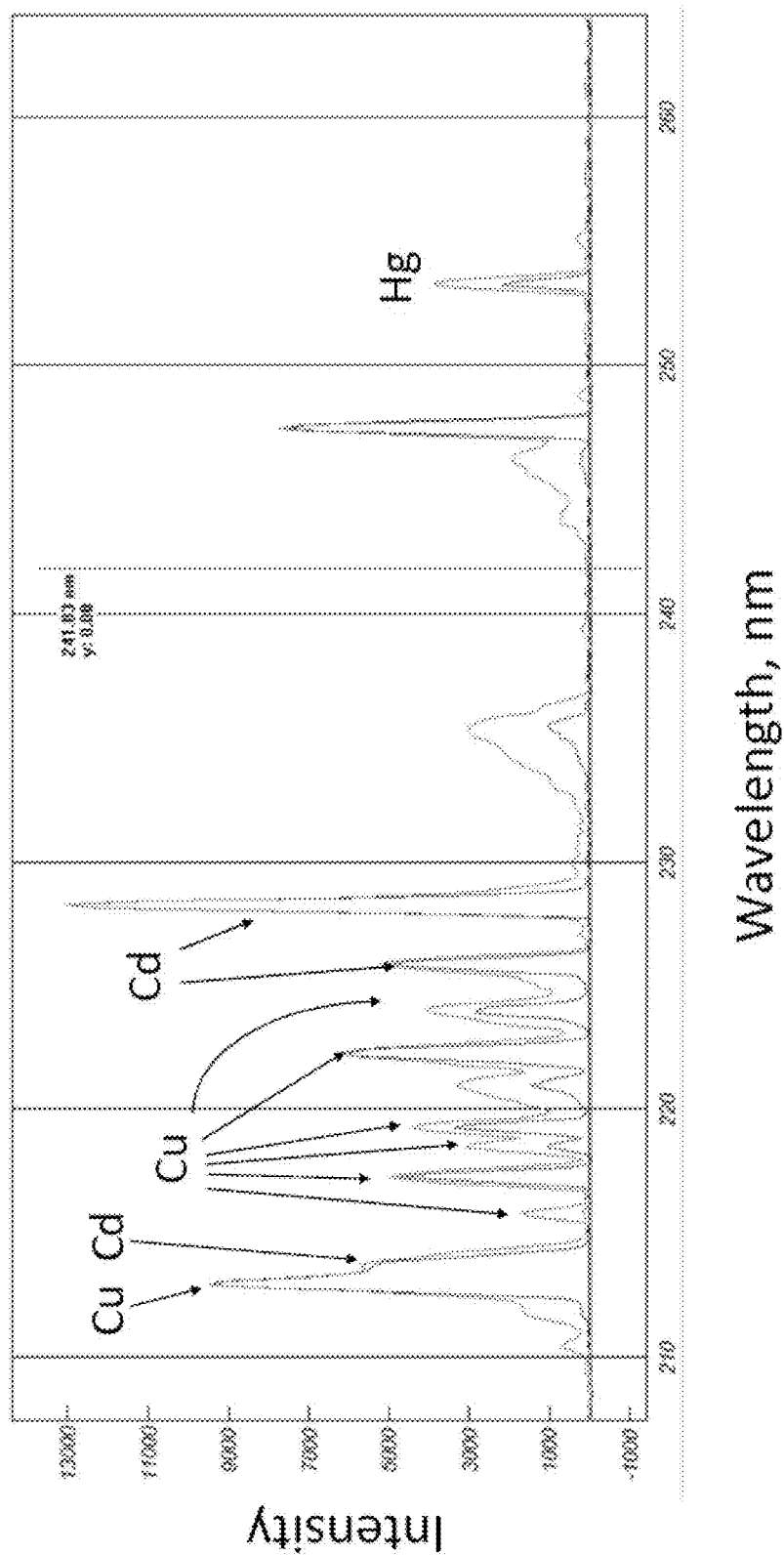
Figure 5C:
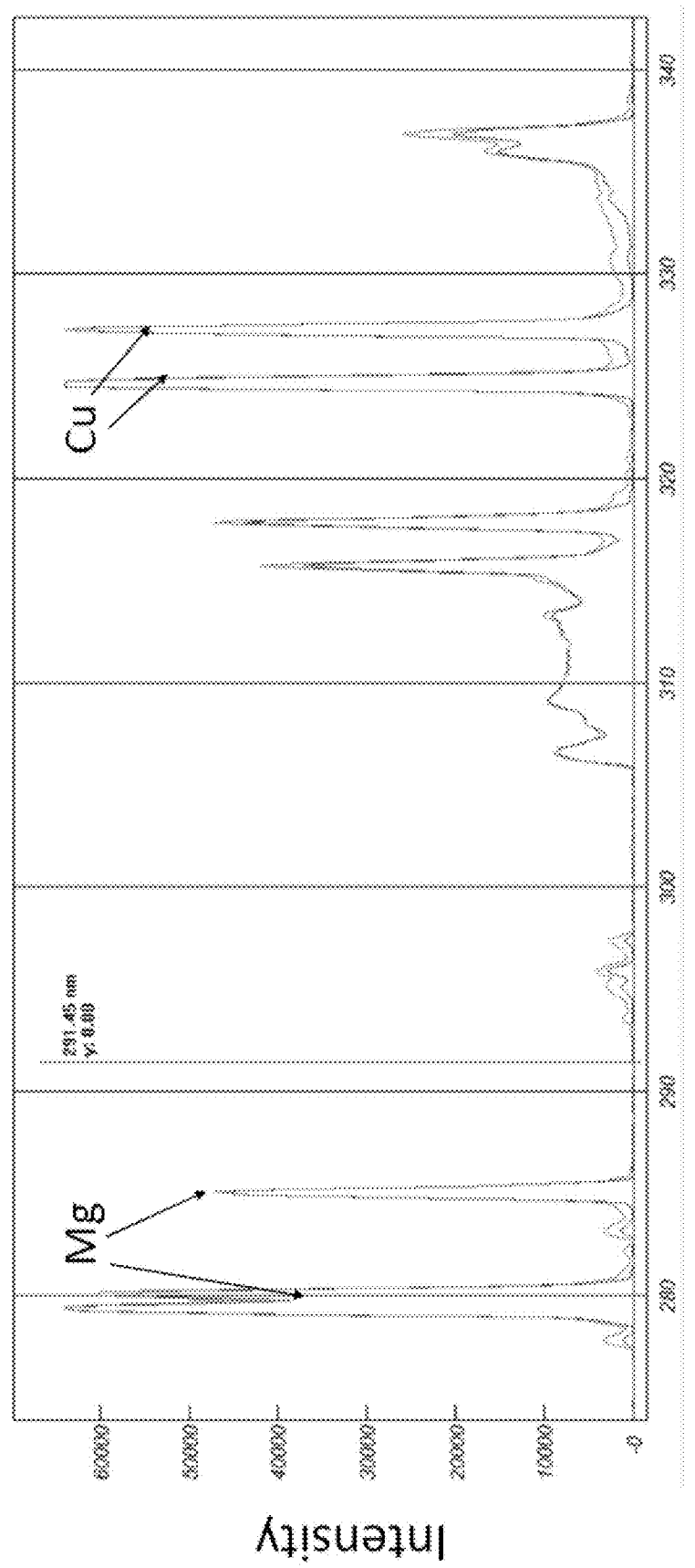
Figure 5D:
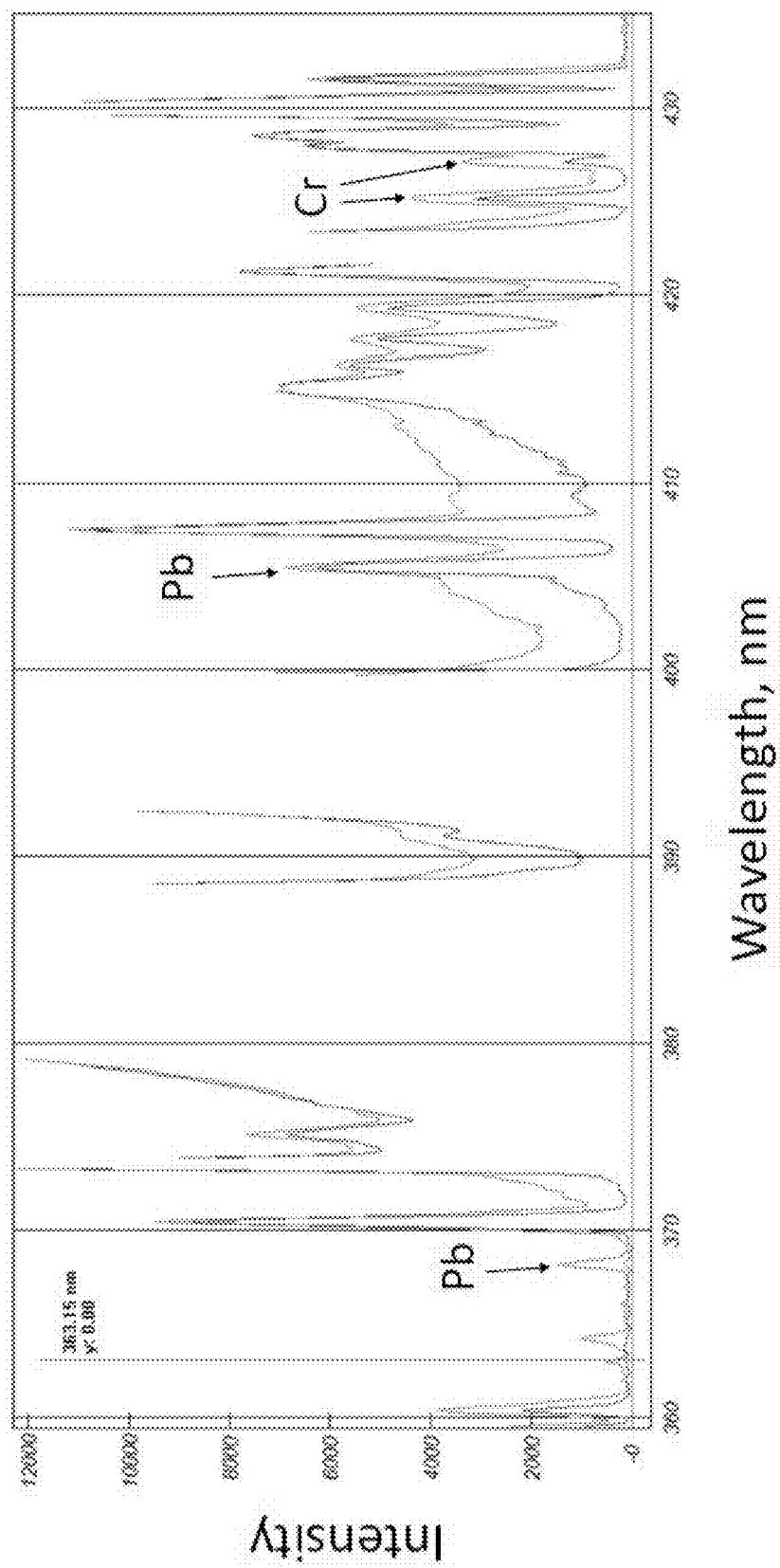

As shown in FIG. 4a-c, the electrodes 410 and 411 are connected to either a DC power supply/potentiostat/galvanostat or a DC or AC high voltage power supply through electrical connectors 418 and 419 and electrical cables 420 and 421.

As shown in FIG. 4c, a flat or a concave mirror 422 can be placed in front of the discharge and across from a fiber optic cable 417 or the optical spectrometer's entrance slit 417. As in the device 100, the mirror is used to reflect light back into the optical spectrometer, thus improving the light throughput into the spectrometer and hence improving the sensitivity of the device.

As in the device 100, the cathode 410 and the anode 411 electrodes may be composed of various materials including, but not limited to, graphite, graphite composite, carbon nanotubes, graphene, fullerene, tungsten, molybdenum, platinum, iridium, gold, aluminum, rhenium, ruthenium, titanium, tantalum or their oxides as well as composite electrodes or electrodes composed of films deposited on the surface of a solid electrode. The cathode 410 or the anode 411 electrodes may or may not be covered by a non-conductive and inert coating including, but not limited to, a Teflon coating or its derivatives, leaving only the end of the electrode exposed, as shown in FIG. 2.

FIG. 5a-5d shows two consecutive spectra obtained during the application of a high voltage discharge after a 10 min electrodeposition with a 4 L tap water sample spiked with 10 ppb of Cd, Hg, Pb and Cr using an apparatus shown in FIG. 1. Cadmium, mercury, lead and chromium are on the list of World Health Organizations' list of toxic chemicals of greatest concern to human health. The water sample was collected from a local residential tap (Woodbridge, ON, Canada) and had a total hardness of 130 ppm. Water containing more than 120 ppm total equivalent $CaCO_3$ is considered hard. The electrodeposition potential used for obtaining the spectrum in FIG. 5a-5c was 12V. Harder water samples (containing higher concentrations of total equivalent $CaCO_3$) have a greater conductivity and therefore, require lower electrodeposition voltages while softer water samples require higher electrodeposition voltages. The estimated detection limits (3σ) obtained from the spectra in FIG. 5a-5d were 0.03 ppb, 0.2 ppb, 0.3 ppb and 0.2 ppb for Cd, Hg, Pb and Cr, respectively. The United States Environmental Protection Agency's (US EPA) maximum permissible concentrations for Cd, Hg, Pb and Cr in drinking water are 5 ppb, 2 ppb, 15 ppb and 100 ppb, respectively. The guidelines set by the World Health Organization for drinking water are 3 ppb, 1 ppb, 10 ppb and 50 ppb for Cd, Hg, Pb and Cr, respectively. Health Canada's drinking water guidelines allow maximum concentrations of 5 ppb of Cd, 10 ppb of Pb, 1 ppb of Hg and 50 ppb of Cr. It should be noted that the detection limits obtained are dependent on the electrodeposition time as well as sample volume and therefore, can be improved by extending the electrodeposition time and/or increasing the sample volume. Therefore, the detection limits obtained by the device in FIG. 1 are sufficient for simultaneous monitoring of the concentrations of these heavy metals in drinking water. It should be noted that other metals which can be preconcentrated by electrodeposition on the electrode surface, can also be analyzed by this method.

The apparatus described in FIGS. 1-5 is advantageous over prior art devices as samples can be analyzed as they are without the use of any chemical modifiers such as strong and concentrated acids, as required by ICP-OES, ICP-MS or the ambient atmospheric glow discharge method described by Webb et al. (U.S. Pat. No. 7,929,138 B1). This reduces cost, waste disposal problems as well as possibility of introducing contamination into the sample. In addition, the spectrochemical detection step avoids the interference problems encountered with the electrochemical detection methods. The electrochemical detection methods are more prone to interferences than spectrochemical detection methods since the peaks in anodic/cathodic stripping voltammetry are broader than spectroscopic peaks and thus prone to overlap. Also, the peak potentials encountered in electrochemical detection methods are dependant on sample composition such as solution pH. In addition, the electrochemical preconcentration step used in devices 100, 300 and 400 minimizes the matrix effect problems encountered in ICP-MS and ICP-OES which are caused by suppression of ionization of analyte by highly abundant and easy to ionize elements such as calcium and magnesium. This apparatus is simple, inexpensive, amenable to automation, is field-deployable and can be used for operator-free online monitoring of water quality. All the steps involved in sample and data analysis may be automated and under a microcontroller and/or a computer control. The data acquired during sample analysis may be transferred to one or more computers or to a cloud network for data logging and alert if the concentration of one or more analytes being monitored exceeds set limits.

Although embodiments have been described, it will be appreciated by those skilled in the art that variations and modifications may be made without departing from the scope defined by the appended claims, and the scope of the claims should be given the broadest interpretation consistent with the description as a whole.

For example, although the above description of devices 100, 300 and 400 includes a separate voltage/current source for the electrodeposition and the electric discharge steps, a variation of the devices in which the electrodeposition and electric discharge steps are performed by application of high voltage from the same DC high voltage power supply is also possible.

PATENT LITERATURE

U.S. Pat. No. 7,929,138 B1 April 2011 Webb et al.

NON PATENT LITERATURE

Modified Electrodes Used for Electrochemical Detection of Metal Ions in Environmental Analysis; G. March, T. Dung Nguyen, B. Piro; Biosensors, 5, pp. 241-275 (2015).

Bringing part of the lab to the field: On-site chromium speciation in seawater by electrodeposition of Cr(III)/Cr (VI) on portable coiled-filament assemblies and measurement in the lab by electrothermal, near-torch vaporization sample introduction and inductively coupled plasma-atomic emission spectrometry; H. Badiei, J. McEnaney, V. Karanassios; Spectrochimica Acta Part B, 78, pp. 42-49 (2012)

Taking part of the lab to the sample: On-site electrodeposition of Pb followed by measurement in a lab using electrothermal, near-torch vaporization sample introduction and inductively coupled plasma-atomic emission spectrometry; H. Badiei, C. Liu, V. Karanassios; Microchemical Journal, 108, pp. 131-136 (2013)

Developing electrodeposition techniques for preconcentration of ultra traces of Ni, Cr and Pb prior to arc atomic emission spectrometry determination; N. Mashkouri Najafi, M. Eidizadeh, S. Seidi, E. Ghasemi, R. Alizadeh; Microchemical Journal, 93, pp. 159-163 (2009)

Determination of heavy metals by electrothermal atomic absorption spectrometry after electrodeposition on a graphite probe; J. Komarek, J. Holy; Spectrochimica Acta Part B, 54, pp. 733-738 (1999)

Determination of Heavy Metals in Seawater by Atomic Absorption Spectrometry after Electrodeposition on Pyrolytic Graphite-Coated Tubes; G. E. Batley and J. P. Matousek; Analytical Chemistry, 49, pp. 2031-2035 (1977)

United States Environmental Protection Agency, Lead and Copper Rule (LCR), and National Primary Drinking Water Regulations for Lead and Copper 40 CFR Parts 9, 141 and 142, Jan. 12 2000

In: Guidelines for drinking-water quality [electronic resource] incorporating first addendum, 3rd ed., Recommendations, vol. 1, World health Organization, 2006.

Guidelines for Canadian Drinking Water Quality, Health Canada, December 2010.

What is claimed is:

1. A device for analyzing the elemental composition of a liquid sample comprising:

an anode electrode and a cathode electrode placed so that electroactive ends of the two electrodes are facing each other with a gap separating the two electrodes;

a pump configured to pump liquid in and out of the device allowing the electrodes to be submerged in said liquid;

a direct current (DC) power supply or a potentiostat/galvanostat and a high voltage power supply are configured to be in electrical contact with said electrodes through switches, wherein the switches are configured to selectively connect the electrodes either to said DC power supply/potentiostat/galvanostat or to a high voltage power supply, wherein said DC power supply/potentiostat/galvanostat provides DC voltage to the electrodes for electrodeposition of analytes on one or both electrode surfaces as well as for providing a reverse polarity voltage in order to clean the electrodes, wherein the high voltage power supply creates an electric discharge between the electrodes; and an optical spectrometer or a mass spectrometer configured to record the emission of the electric discharge or sample the ions generated by the discharge.

2. The device for analyzing the elemental composition of the liquid sample of claim 1, wherein the anode and cathode electrodes are placed inside a transparent or a non-transparent capillary tube.

3. The device for analyzing the elemental composition of the liquid sample of claim 2, wherein the capillary tube is connected to inlet and outlet tubes through which the solution is pumped in and out by the pumping system.

4. The device for analyzing the elemental composition of the liquid sample of claim 1, wherein the electrodes are in electrical contact with a DC power supply, a potentiostat or a galvanostat.

5. The device for analyzing the elemental composition of the liquid sample of claim 4, wherein the DC potential applied between the electrodes to electrodeposit the analytes is adjusted, depending on the composition of the liquid being analyzed.

6. The device for analyzing the elemental composition of the liquid sample of claim 4, wherein the DC potential applied between the electrodes is adjusted to be between 0.1 and 100V.

7. The device for analyzing the elemental composition of the liquid sample of claim 1, wherein the electric discharge comprises any or a combination of arc, spark, glow discharge or plasma.

8. The device for analyzing the elemental composition of the liquid sample of claim 1, wherein the optical spectrometer's entrance slit or a fiber optic cable connected to the optical spectrometer are placed across from said capillary and said electric discharge.

9. The device for analyzing the elemental composition of the liquid sample of claim 1, further comprising a flat or a concave mirror, a mirrored surface or a flexible mirror placed behind or wrapped around a portion of the capillary and across from the optical spectrometer entrance slit or a fiber optic cable connected to the optical spectrometer.

10. The device for analyzing the elemental composition of the liquid sample of claim 1, wherein either the anode or the cathode or both electrodes are covered by a non-conductive and inert coating leaving only the ends of the electrodes exposed.

11. The device for analyzing the elemental composition of the liquid sample of claim 10, wherein an electroactive surface of one of the two electrodes is flat.

12. The device for analyzing the elemental composition of the liquid sample of claim 11, wherein an electroactive surface of another one of the two electrodes is sharpened.

13. The device for analyzing the elemental composition of the liquid sample of claim 10, wherein any of the two electrodes is composed of various materials including but not limited to anyone of the following: graphite, graphite composite, carbon nanotubes, graphene, fullerene, gold, platinum, iridium, aluminum, molybdenum, rhenium, ruthenium, titanium or their oxides or composites.

14. A method of analyzing the elemental composition of a liquid sample, the method comprising the steps of:

providing the device of claim 1;

pumping the analyte containing solution through the capillary tube at a predetermined flow rate and for a predetermined amount of time;

applying a DC potential for a predetermined amount of time to the electrodes while the solution is pumped through the capillary tube resulting in electrodeposition of analytes;

terminating the pumping of the solution through the device followed by pumping out all the solution out of the capillary;

terminating the application of the electrodeposition DC potential to the electrodes either before the solution is pumped out of the capillary or after the solution is pumped out of the capillary;

applying an alternating current (AC) high voltage or constant or pulsed DC high voltage to the electrodes resulting in the generation of an electric discharge between the electrodes;

recording the optical emission or mass spectrum of the resultant electric discharge;

pumping either the same solution as was used in the previous steps or a new solution through the capillary at a predetermined flow rate and for a predetermined amount of time;

applying a DC potential of opposite polarity to that which was used to electrodeposit the analytes while the solution is being pumped through the capillary, resulting in removal of electrodeposited material and cleaning of the electrode surfaces; and pumping the solution out of the capillary.

15. The method of claim 14, wherein sample analysis as well as data acquisition, processing and analysis are carried out autonomously at set intervals.

* * * * *